United States Patent [19]

Nasvytis et al.

[11] 4,408,953
[45] Oct. 11, 1983

[54] HIGH EFFICIENCY CENTRIFUGAL PUMP

[75] Inventors: Pius J. Nasvytis, Avon; George W. Jahrstorfer, South Windsor, both of Conn.

[73] Assignee: Chandler Evans Inc, West Hartford, Conn.

[21] Appl. No.: 337,473

[22] Filed: Jan. 6, 1982

[51] Int. Cl.³ .......................... F01D 1/10; F04D 13/14
[52] U.S. Cl. ........................................ 415/62; 415/143
[58] Field of Search ...................... 415/60, 62, 63, 66, 415/67, 68, 69, 143

[56] References Cited

U.S. PATENT DOCUMENTS

| 803,759 | 11/1905 | Herles et al. | 416/126 |
|---|---|---|---|
| 921,118 | 5/1909 | Kasley | 417/245 |
| 1,032,828 | 7/1912 | Hayton | 415/97 |
| 3,930,744 | 1/1976 | Theis, Jr. | 415/63 |
| 4,105,372 | 8/1978 | Mishina et al. | 415/66 |

FOREIGN PATENT DOCUMENTS

| 19509 | 3/1905 | Austria . | |
| 346865 | 10/1904 | France . | |
| 2458690 | 2/1981 | France | 415/69 |
| 141701 | 5/1980 | German Democratic Rep. | 415/62 |
| 2071765 | 9/1981 | United Kingdom | 415/143 |
| 391291 | 7/1973 | U.S.S.R. | 415/62 |

OTHER PUBLICATIONS

*Aeronautical Journal,* H. S. Bottoms, Jun. 1981, pp. 230 and 231.

Primary Examiner—Philip R. Coe
Assistant Examiner—Thomas W. Epting
Attorney, Agent, or Firm—Radford W. Luther; Richard A. Dornon

[57] ABSTRACT

A high speed fuel pump for a gas turbine engine has a positively-driven shroud (28) positioned between a main impeller (14) and the wall of a pumping cavity (12) to reduce impeller drag. The shroud is formed by a first disc (30) having a boost impeller (36) connected to its central hub portion 30a and a second disc (32) having a gear (32b) carried by its central hub portion (32a). The main drive shaft assembly (24), to which the main impeller is connected, carries a gear (64) which meshes with gear (62) mounted upon a shaft (58). The shaft (58) also carries a gear (56) which meshes with the gear 32b. The gears are sized so that the shroud is driven at one-half the speed of the main impeller in order to maximize impeller drag reduction and enhance pumping capability when severe inlet conditions are present at the pump inlet (10).

4 Claims, 4 Drawing Figures 4,408,953

HIGH EFFICIENCY CENTRIFUGAL PUMP

TECHNICAL FIELD

This invention relates to centrifugal fuel pumps adapted to supply the fuel requirements of gas turbine engines.

BACKGROUND ART

In general, low specific speed centrifugal pumps operating at moderately high speeds (20,000–30,000 rpm) are well-suited for use in gas turbine engines fuel systems. However, prominent drawbacks associated with the utilization of such pumps are the inefficiency at reduced (off design) flows and the limitations imposed upon fuel temperatures and the amount of vapor contained in the fuel at inlet pressure.

The reduced or off-design flows in centrifugal pumps beget inefficient operation owing to the parasitic losses caused by the fuel drag occurring between the impeller and the casing and flow recirculation. The provision of freewheeling discs (which define a shroud) between the impeller and the casing to reduce fluid drag is described in U.S. Pat. Nos. 803,759, 921,118 and 1,032,828, French Pat. No. 346,865 and Austrian Pat. No. 19509.

However, the incorporation of a freewheeling disc between the impeller and the casing presents certain difficulties. First, rotation of the discs will be impeded by mechanical friction and the action of recirculating fluid, thereby resulting in less than optimum disc speed. Second, the lack of a positive drive could result in a drastically reduced speed or stoppage of the discs from fuel contamination or other foreign particles.

DISCLOSURE OF THE INVENTION

In accordance with the invention, there is provided a centrifugal fuel pump having a positively-driven shroud disposed between the main impeller and the housing, thereby establishing a predetermined speed relationship between the main impeller and the shroud and forestalling any slowdown or stoppage of the shroud. In order to maximize the efficiency of the pump, the shroud is preferably driven at one half the speed of the main impeller.

A further feature of the invention is the provision of a boost impeller integral with or attached to one of the discs which form the shroud. Such a boost impeller operating at about one-half speed of the main impeller will greatly enhance pumping capability when severe inlet conditions (i.e., low inlet fuel pressure, high temperature, and high vapor to liquid ratios) are present because of its capacity to operate within prescribed boundaries of suction specific speed and inlet tip speed. In addition, a boost impeller attached to the shroud renders the pump package relatively compact.

Accordingly, it is a primary object of the invention to provide a centrifugal fuel pump having a positively driven shroud between the main impeller element and the housing.

Another object is to provide a centrifugal fuel pump having a boost impeller driven at a lesser speed than the main impeller.

These and other objects and advantages of the invention will become more readily apparent from the following detailed description, taken in conjunction with the accompanying drawings.

BEST MODE OF CARRYING OUT THE INVENTION

Figure 1:
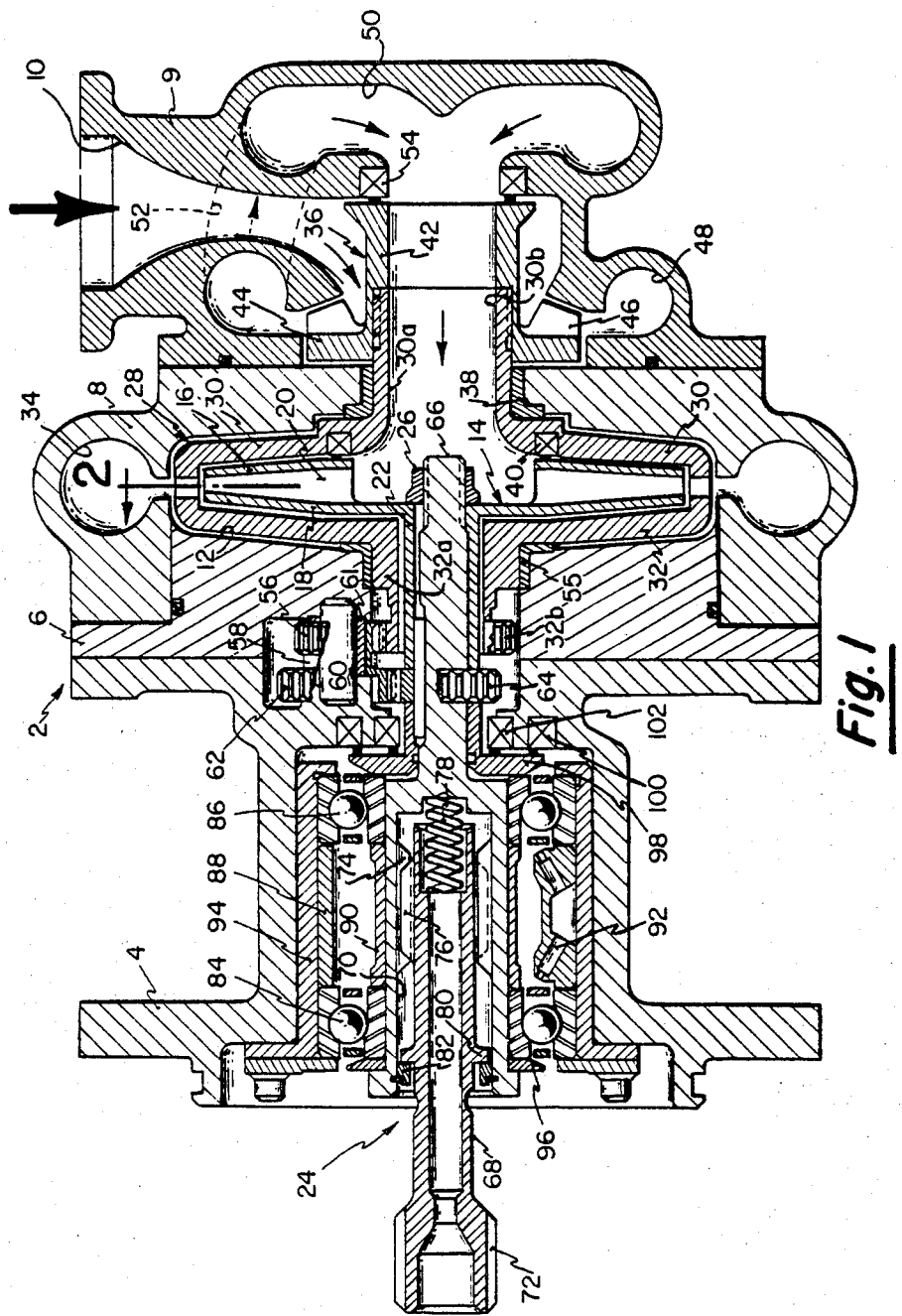
FIG. 1 is a longitudinal sectional view of a pump according to the invention.

Referring to FIG. 1, there is shown an impeller pump according to the invention. The pump includes a multipart, plural cavity housing formed by housing sections 4,6,8, and 9. Housing section 9 embodies an inlet 10 and housing section 8 embodies an outlet (not shown) which communicates with a pumping cavity 12 in which a main impeller, generally designated 14, is mounted for rotation.

The main impeller 14 has a front plate 16, a back plate 18 and a plurality of radial vanes 20 disposed therebetween and extending to the outer periphery of the main impeller. The main impeller further includes a central hub 22 to which is secured the end of a drive shaft assembly, generally designated 24, by means of a nut 26 so as to be rotatable in unison therewith.

Surrounding the impeller 14 is a shroud, generally shown at 28, the function of which is to reduce the fuel drag that is occasioned by the rotating impeller 14. The shroud 28 is preferably formed by two discs 30 and 32 which may be interconnected at the peripheral passage formed therebetween by blades or struts 33 (FIG. 2) to hold the discs apart against the pressure acting thereupon and define a rotating diffuser. As can be seen from FIG. 1, the outer surface of the shroud 28 is located closely adjacent but spaced from the surface of the wall of the cavity 12. It should also be apparent that the respective outer surfaces of the front and back plates 16 and 18 of the main impeller 14 are located closely adjacent the interior surfaces of the shroud 28.

The fuel impelled by main impeller 14 transverses the openings between the struts in the outer periphery of the shroud 28 and is thence received within a constant cross section collector 34. Such a collector is beneficial where efficiency considerations are paramount because of minimized recirculation losses. Alternatively, stationary diffusers and a typical volute form may be provided.

The disc 30 comprises a central hub portion 30a which defines a central passage 30b communicating with the eye of the main impeller 14. The right or front end of the hub portion 30a carries a plurality of exterior threads, whereby a boost impeller, generally indicated at 36, may be threadably mounted thereupon for rotation therewith. The disc 30 is supported for rotation in a sleeve bearing 38. The disc 30 is also provided with a carbon faced seal 40 which is in a wiping engagement with the front plate 16 of the main impeller 14 to thereby seal off the volume between the front plate 16 and the disc 30 from the eye of the main impeller 14.

The boost impeller 36, which is fixedly mounted upon the disc 30, is formed by a hollow tubular section 42 having a flange 44 at its base. The flange carries a plurality of vanes 46 which accelerate the incoming fuel flow in the inlet 10 into a collector 48. Flow from the collector 48 of the boost impeller 36 proceeds to a cavity 50 formed in the housing section 9 via a duct 52 (shown in dashed lines). The cavity 50 is, in turn in fluid communication with the interior of the tubular section 42, whereby flow from the boost impeller 36 may proceed to the inlet passage 30b. In order to isolate the flow entering the tubular section 42 from flow in the inlet 10, a carbon faced seal 54 mounted in the housing section 9 is in wiping contact with the annular end of the tubular section 42.

Figure 3:
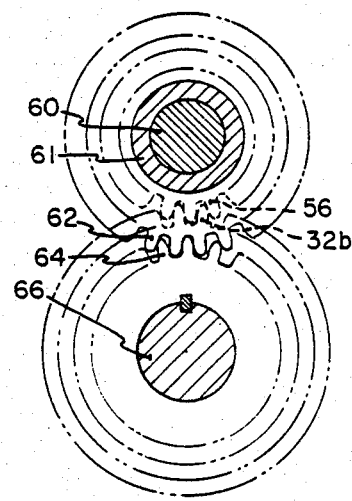
FIG. 3 is a schematic view of the gear train which drives the shroud.

The disc 32 incorporates a central hub portion 32a which is mounted for rotation in a sleeve bearing 55. The rear end of the central hub portion 32a carries a gear 32b which may be attached thereto or formed thereupon. The gear 32b is in meshing engagement with another gear 56 integral with a hollow shaft 58. The shaft 58, which is rotatably mounted upon a pin 60 having a surrounding bushing 61, also carries another gear 62 integral therewith. The latter mentioned gear 62 meshes with yet another gear 64 mounted upon the drive shaft assembly 24 in abutting relationship with the rear of the central hub 22. The gears are preferably sized, whereby the disc 32, and hence the shroud 28, is driven at one half the speed of the impeller in order to maximize pump efficiency. As is shown in FIGS. 1 and 3, the gears 62 and 64 are of equal size but gear 32b is twice the diameter of gear 56. Alternatively, other gearing arrangements to ameliorate balancing or other specific needs may be provided.

The drive shaft assembly 24, which is of conventional design includes a main drive shaft 66 and a drive shaft coupling 68 received within a bore 70 in the rear portion thereof. The main drive shaft 66, of course, carries the gear 64 and the impeller 14. The coupling 68 has the usual splined end 72 adapted to be connected to the engine gear box. The main drive shaft 66 has a plurality of internal splines 74 which mate with a plurality of external splines 76 and thereby form a driving interconnection between the coupling 68 and the shaft 66. A compression spring 78 interposed between the coupling 68 and the shaft 66 urges the coupling to the left or rear such that a flange 80 abuts a snap ring and collar assembly 82 mounted adjacent the rear end of the bore 70. The shaft 66 is mounted for rotation by means of two axially spaced bearings 84 and 86. The bearings are separated in the usual manner by spacers 88 and 90 which respectively bear against the outer and inner races of the bearings. As shown in FIG. 1, the outer spacer 88 is provided with oil lubrication passages 92. A bearing retainer 94, interposed between the bearings and the housing section 4, serves to position the outer races of the bearings while an oil slinger 96 and the rear of a face seal 98 respectively position the inner races of the bearings and preload the entire bearing assembly. Two carbon faced seals 100 and 102, disposed in the housing section 4 are in wiping engagement with the seal face for isolating the oil in the bearing assembly from the gears 32b, 56, 62 and 64 which are lubricated by fuel.

Figure 2:
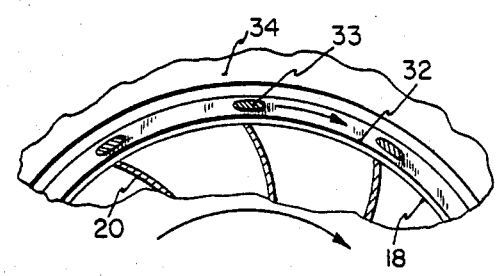
FIG. 2 is a sectional view of the periphery of the shroud taken along the line 2—2 of FIG. 1.
Figure 4:
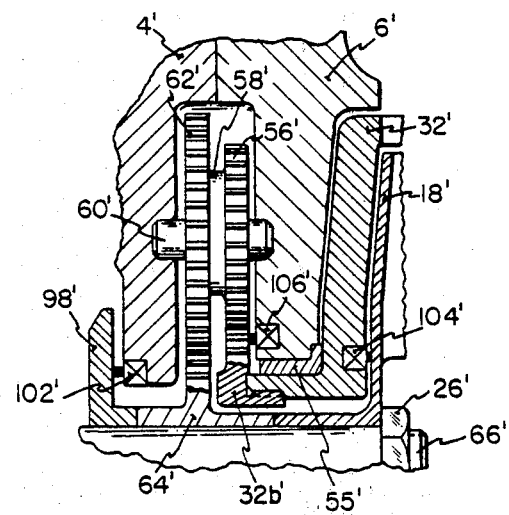
FIG. 4 is a fragmentary longitudinal, sectional view of a slightly modified version of the pump of FIGS. 1-3 wherein the gears are isolated from the fuel.

Turning now to FIG. 4, wherein elements similar to those of FIGS. 1–3, which will not be discussed for the sake of brevity, are designed by like primed numerals, there is depicted a second embodiment of the invention. The second embodiment is distinguishable from the first embodiment in that the cavity in which the gears are located is isolated not only from lubricating oil but also from fuel. It will be appreciated that such an arrangement will reduce the drag on the rotating gears from that which would otherwise occur if the gears were rotating in fuel. This form of the invention may be desirable if even more efficient operation is mandated.

As shown in FIG. 4, the disc 32' is provided with a carbon faced seal 104 which wipes against the back plate 18' of the impeller, thereby sealing off the cavity containing the gears from the fuel occupying the space between the disc 32' and the back plate 18'. In addition, another carbon faced seal 106 mounted in the housing 6', wipes against the front face of the gear 32b' in order to isolate the cavity containing the gears from the fuel between the wall of the pumping cavity 12' and the disc 32'. It will be appreciated that the gear 32b' is in threaded engagement with the disc 18' although it could be formed integral therewith if desired.

In operation, fuel enters the pump through the inlet 10 and proceeds thence to the boost impeller 36 which is turning at one-half the speed of the main impeller 14. Flow from the boost impeller 36 enters the collector 48 and from there proceeds to the inlet passage 30b via duct 52, cavity 50, and the interior of the tubular section 42 of the boost impeller 36. Flow from passage 30b enters the eye of the main impeller and subsequently enters the collector 34 through the annular peripheral passage (which functions as a rotating diffuser) between the discs 30 and 32 of the shroud 28.

Rotation of the drive shaft assembly 24 results in rotation of the main impeller 14 at the same RPM due to its direct connection thereto. However, the drive mechanism, as defined by gears 62, 64, 56 and 32b effects a rotation of the disc 32, and hence a rotation of the entire shroud 28, at one-half the RPM of the main impeller 14, thereby contributing to optimum pump efficiency.

Obviously, many modifications and variations are possible in light of the above teachings, without departing from the scope or spirit of the appended claims.

We claim:

1. In a high speed centrifugal fuel pump of the type having:

a housing with a pumping cavity therein, a main impeller mounted for rotation in the pumping cavity and a drive shaft assembly mounted in the housing for rotation and operatively connected to the main impeller for concurrent rotation at the same RPM, a shroud mounted for rotation in the housing surrounding the impeller in closely spaced relationship thereto, the improvement comprising:

a gear mounted on the drive shaft assembly;

a gear on the shroud;

two integral interconnecting gears in respective meshing engagement with the first and second mentioned gears and sized to rotate the second mentioned gear at one-half the RPM of the first mentioned gear whereby the shroud is rotated at an RPM one-half that of the drive shaft assembly; and seal means to isolate the gears from oil and fuel to minimize drag on the rotating gears.

2. In a high speed centrifugal fuel pump of the type having:

a housing with a pumping cavity therein and an inlet in communication therewith, a main impeller mounted for rotation in the pumping cavity and a drive shaft assembly mounted in the housing for rotation and operatively connected to the main impeller for concurrent rotation at the same RPM, a shroud mounted for rotation in the housing surrounding the impeller in closely spaced relationship thereto, a drive mechanism operatively interconnecting the drive shaft assembly and the shroud for rotating the shroud at an RPM less than that of the drive shaft assembly, the improvement comprising:

a boost impeller mounted upon the shroud and in fluid communication with the inlet for accelerating the incoming fuel flow before it enters the main impeller.

3. The improvement of claim 2, wherein the shroud comprises:

a first disc mounted for rotation on one side of the main impeller;

a second disc in confronting relationship to the first disc mounted for rotation on the other side of the impeller such that a flow passage is defined between the respective peripheries of the discs; and a plurality of contoured cross members bridging the flow passage for interconnecting the discs.

4. The improvement of claim 2, wherein the drive mechanism is of the type which comprises:

means to rotate the shroud at one-half the RPM of the drive shaft assembly.

* * * * *